United States Patent [19]

Yamamoto et al.

[11] Patent Number: 4,750,758
[45] Date of Patent: Jun. 14, 1988

[54] LATCH DEVICE FOR MOVABLE ANCHOR IN PASSIVE SEAT BELT SYSTEM

[75] Inventors: Kazuo Yamamoto; Osamu Kawai, both of Fujisawa, Japan

[73] Assignee: Nippon Seiko Kabushiki Kaisha, Tokyo, Japan

[21] Appl. No.: 931,037

[22] Filed: Nov. 17, 1986

Related U.S. Application Data

[63] Continuation of Ser. No. 720,501, Apr. 5, 1985, Pat. No. 4,647,070.

[30] Foreign Application Priority Data

Apr. 9, 1984 [JP] Japan ............................ 59-50771[U]

[51] Int. Cl.⁴ ........................................... B60R 22/06
[52] U.S. Cl. .................................... 280/804; 297/468
[58] Field of Search ............... 280/804, 808, 802, 801, 280/803; 297/468, 469, 483

[56] References Cited

U.S. PATENT DOCUMENTS

| 4,039,224 | 8/1977 | Bauer et al. | 297/389 |
|---|---|---|---|
| 4,456,283 | 6/1984 | Michael et al. | 280/804 |
| 4,475,745 | 10/1984 | Foehl | 280/804 |
| 4,491,344 | 1/1985 | Foehl | 280/808 |
| 4,560,187 | 12/1985 | Yoshitsugu | 280/804 |
| 4,573,709 | 3/1986 | Kawai et al. | 280/804 |
| 4,597,588 | 7/1986 | Kawai | 280/808 |
| 4,607,863 | 8/1986 | Yokote | 280/804 |

FOREIGN PATENT DOCUMENTS 58-55082 12/1983 Japan .

Primary Examiner—John J. Love
Assistant Examiner—Karin L. Ferriter
Attorney, Agent, or Firm—Wegner & Bretschneider

[57] ABSTRACT

Disclosed herein is a latch device for a movable anchor in a passive seat belt system for mounting on a vehicle. The latch device includes a movable anchor, a latch releasably engageable with the movable anchor, actuator means releasably holding the latch in engagement with the movable anchor, an actuator member for bringing the latch into engagement with the movable anchor by way of the actuator means when the movable anchor moves to its occupant-restraining position, and switch means associated with the latch in such a way that it is actuated when the movable anchor has reached the occupant-restraining position and the latch has been brought into engagement with the movable anchor. The position of the latch is directly related to whether the movable anchor has been locked by the latch or not. It is thus necessary to provide only one switch means for stopping the rearward movement of the movable anchor and for confirming the latching between the movable anchor and the latch. The latch device has been rendered compact and economical.

12 Claims, 9 Drawing Sheets

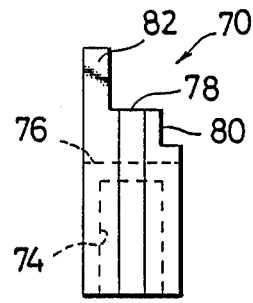
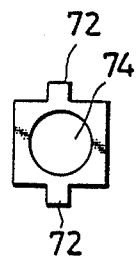
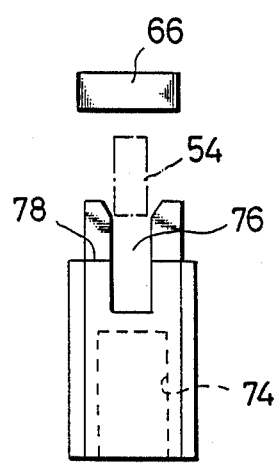
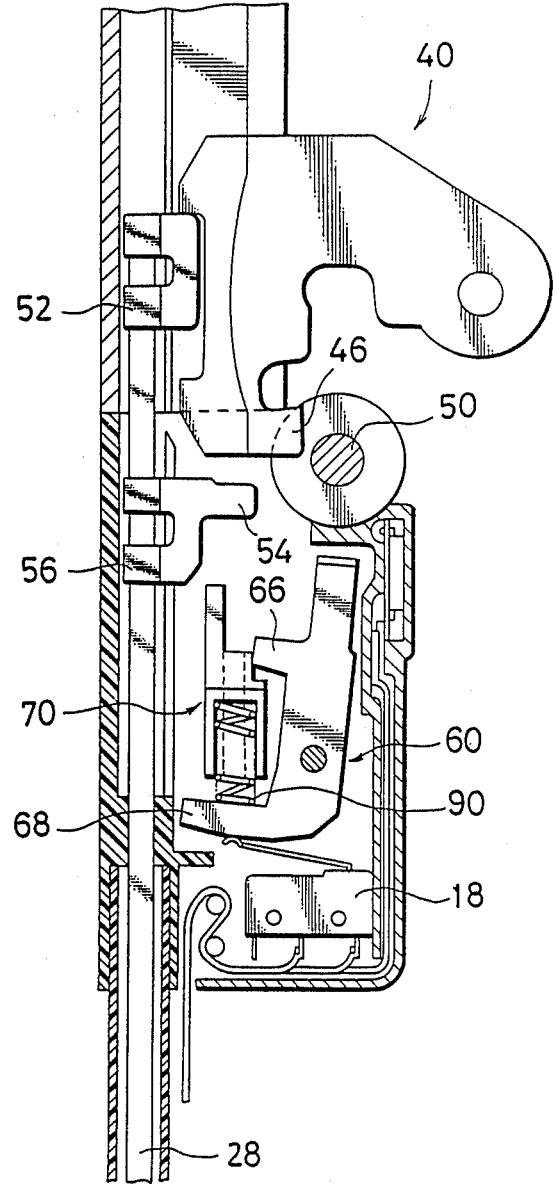

LATCH DEVICE FOR MOVABLE ANCHOR IN PASSIVE SEAT BELT SYSTEM

This application is a continuation of Ser. No. 720,501, filed Apr. 5, 1985, now U.S. Pat. No. 4,647,070.

BACKGROUND OF THE INVENTION (1) Field of the Invention

This invention relates to an improvement in or relating to a latch device for locking and releasing a runner member carrying a webbing fastened at one part of the latter to the former and movable on a guide member, namely, a movable anchor in a so-called passive seat belt system.

(2) Description of the Prior Art

The movable anchor moves rearward on the guide rail and is locked to a latch of a latch device in association with each closure of its associated door. In association with each opening of the door, the movable anchor is in turn released from the latch of the latch device and moves forward on the guide rail. Accordingly, the webbing is allowed to take either occupant-restraining or occupant-releasing position.

In many of conventi,onal latch devices, latches which engage their corresponding movable anchors are kept at engageable positions even if their associated webbings, namely, the movable anchors are not at their occupant-restraining positions. When the movable anchors are brought to their respective occupant-restraining positions, the latches are tentatively moved to their non-engagement positions. When the movable anchors have then reached completely their corresponding occupant-restraining positions, the latches are again caused to return to their engagement positions and to engage their corresponding movable anchors.

On the other hand, it is generally necessary to provide with warning means which serves to determine whether the latch and its associated anchor are actually latched or not.

In a warning device of a conventional latch device having a latch which operates in the above-described manner, it is indispensable to provide two independent switch means for detecting the positions of both movable anchor and latch respectively in order to determine whether the latch and movable anchor are actually latched to each other since there is no direct relation between the latch's assuming the engagement position and the engagement of the latch with the movable anchor. Where the movable anchor is driven by electrical means such as motor or the like, it is necessary to provide switch means exclusively for warning the position of the latch, namely, for detecting the position of the latch in addition to switch means for detecting the arrival of the movable anchor at the occupant-restraining position and stopping the motor or the like.

Since the latch device requires two switch means as described above, there are such drawbacks that the reliability tends to become lower with respect to the actuation of the latch device, the dimensions of the latch device become greater, and its manufacturing cost increases.

SUMMARY OF THE INVENTION

The present invention has been completed to solve the above-described drawbacks of conventional latch devices and to provide a highly-reliable, economical and compact latch device.

In order to achieve the object, this invention provides:

a latch device for a movable anchor in a passive seat belt system for mounting on a vehicle, which comprises:

a movable anchor for fastening a webbing thereon, said movable anchor being moved by a drive member on a guide member, which is to be mounted within the interior of the vehicle, between a restraining position at which the webbing restrains an occupant and a release position at which the webbing releases the occupant, and said movable anchor having a first interlocking portion;

a latch having a second interlocking portion which is engageable with the first interlocking portion of the movable anchor and is movable between an engagement position at which the second interlocking portion is brought into engagement with the first interlocking portion and a non-engagement position where the second interlocking portion is kept out of engagement with the first interlocking portion; actuator means normally biasing the latch toward the engagement position and changeable between a first state in which the actuator means holds the second interlocking portion of the latch in the engagement position and a second state in which the actuator means holds the second interlocking portion of the latch in the non-engagement position;

an actuator member provided fixedly with the drive member, said actuator member moving the second interlocking portion of the latch to the non-engagement position so as to permit the change of the actuator means into the second state when the movable anchor moves from the restraining position to the release position, and when the movable anchor moves from the release position to the restraining position, releasing the actuator means from the second state so as to permit the movement of the latch to the engagement position and after the movement, bringing the actuator means to the first state; and switch means associated with the latch in such a way that the switch means assumes a first position when the second interlocking portion of the latch has been brought into engagement with the first interlocking portion of the movable anchor and a second position when the second interlocking portion of the latch has been rendered out of engagement with the first interlocking portion of the movable anchor.

The above latch device of this invention can successfully fulfill the above-mentioned object of this invention.

The above and other objects, features and advantages of the present invention will become more apparent from the following description and the appended claims, taken in conjunction with the accompanying drawings.

BRIEF DESCRIPTION OF THE DRAWINGS

FIG. 5 is a front view of a slider in the latch device of the first embodiment;

FIG. 6 is a bottom view of the slider in the latch device of the first embodiment;

FIG. 7 is a side view of the slider in the latch device of the first embodiment;

FIG. 8 is cross-sectional view showing the operation of the latch device of the first embodiment;

DETAILED DESCRIPTION OF THE INVENTION AND PREFERRED EMBODIMENTS

The latch device according to the first embodiment of this invention will now be described with reference to FIGS. 1 through 8.

Figure 1:
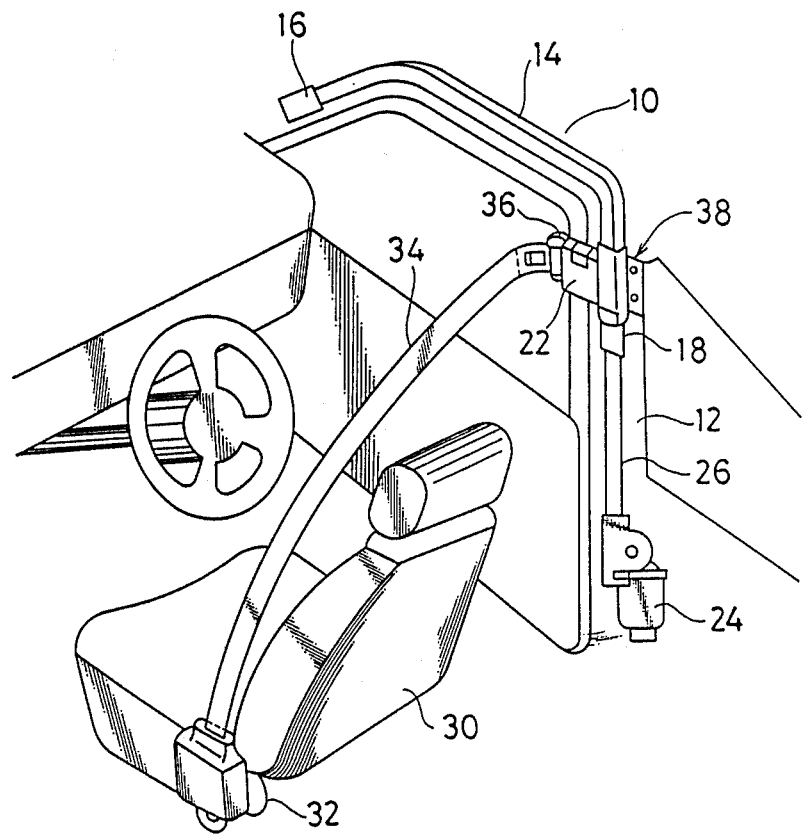
FIG. 1 is a perspective view showing the entirety of a passive seat belt system incorporating the present invention.

As shown in FIG. 1, a guide rail 14 is arranged in a bent shape in the interior of a vehicle, namely, over a side roof 10 and center pillar 12. Switches 16 and 18 are fixedly provided at the front and rear ends of the guide rail 14 respectively. On the guide rail 14, there is movably attached a movable anchor 40 (see, FIG. 2), on which an emergency release buckle (ERB) 22 is provided as a unitary member. The movable anchor 40 is caused to move on the guide rail 14, when a drive member (drive wire) 28 fastened at one end thereof fixedly to a pulley 21 connected to the drive shaft of a motor 24 through a reduction mechanism (not shown) and received in a vortical guide channel 23 is released from the guide channel 23 or is taken up into the guide channel 23 as shown in detail in FIGS. 3 and 4. Incidentally, FIGS. 3 and 4 also illustrate a bracket 27 for mounting the motor 24, pulley 21, etc. on the vehicle body, a casing 29 attached to the bracket 27, a cover 31 extending over the pulley 21, and a wire guide 33 for guiding the drive member 28. By the way, the drive member 28 moves while guided through the channel of the guide rail 14. Between the motor 24 and guide rail 14, the drive member 28 is guided within an outer tube 26.

As shown in FIG. 1, a webbing 34 extends out from a retractor 32, which is secured fixedly beside the seat 30, and terminates in a tang 36 which is inserted in the ERB 22. The movable anchor 40 is releasably locked on a latch device 38.

The latch device 38 and its associated members will next be described with reference to FIG. 2. The movable anchor 40 provided movably on the guide rail 14 includes an interlocking tab 42 engageable with the ERB 22, an engagement notch 44 for receiving an anchor pin 50, a curved portion 46 as a first interlocking portion which is brought into engagement with a latch 60, and a recess 48 in which a movable anchor guide 52 is fit.

The movable anchor guide 52 is attached to the leading end of the drive member 28. On a portion of the drive member 28 which portion is somewhat apart toward the outer tube 26 from the leading end thereof, there is provided a latch actuator 56 which has a head 54 and serves as an actuator member.

The latch 60 is pivotally attached by way of a pivot 62 to an anchor latch cover 58 secured fixedly on the center pillar 12. The latch 60 has a bent portion 64 as a second interlocking portion, which engages the curved portion 46 of the movable anchor 40, and first and second arms 66,68 extending laterally. In the vicinity of the latch 60, a slider 70 is movably arranged between the arms 66 and 68. As illustrated in FIGS. 5 to 7, the slider 70 is movable within a predetermined range and in the vertical direction (as viewed in FIG. 2) with ridges 72, which are formed respectively on the front and rear walls thereof, guided by their corresponding guide slots (not shown) formed through the anchor latch cover 58. The slider 70 defines a circular hole 74. As illustrated in FIG. 2, a coil spring 90 inserted in the circular hole 74 is kept in contact at a lower end portion thereof with the second arm 68 of the latch 60. On the other hand, the slider 70 is bifurcated at an upper end portion thereof, thereby forming a socket 76 between the branches. On the bifurcated upper end portion of the slide 70, there are formed abutment surfaces 78,80, which are brought into contact with the first arm 66 of the latch 60, and a lug 82 which is brought into contact with the curved portion 46 of the movable anchor 40.

Underneath the latch 60, the rear end switch 18 is fixedly disposed. The second arm 68 is brought into contact with an actuating lever 19 for the rear end switch 18. Furthermore, an ERB switch 84 is also fixed beside the latch 60.

The operation of latch device of the first embodiment will hereinafter be described.

When the passive seat belt system is ready for the entry of the occupant into the vehicle, the movable anchor 40 and ERB 22 have already driven by the drive member 28 and assume their front end positions on the guide rail 14. Therefore, the webbing 34 does not impair the entry of the occupant into the vehicle. By the way, the front end switch 16 is provided to stop the operation of the motor 24 so that the movable anchor 40, which has been being moved frontward along the guide rail 14 when the occupant gets off the vehicle, is stopped. When the occupant has entered and vehicle and the door has then been closed, the motor 24 is driven to take up the drive member 28 (in other words, to cause the drive member 28 to move downward as viewed in FIG. 2) so that the movable anchor guide 52 drives the movable anchor 40 and ERB 22 rearward along the guide rail 14. Here, the slider 70 assumes its raised position and the abutment surface 80 of the slider 70 is thus in contact with the first arm 66 of the latch 60. Accordingly, the latch 60 is held against the biasing force of the spring 90 in a state turned clockwise. Hence, there is no danger of interference between the bent portion 64 or first arm 66 of the latch 60 and the head 54 of the latch actuator 56 (see, FIG. 8).

When the latch actuator 56 enters the latch device 38, the head 54 enters the socket 76 of the slider 70 (see, FIG. 7) and contacts the bottom wall of the socket 76 to depress the slider 70 downwardly against the action of the spring 90. As a result, the engagement between the abutment surface 80 of the slider 70 and the first arm 66 of the latch 60 is released and the latch 60 is hence caused to turn counterclockwise owing to the action of the spring 90. This counterclockwise turn of the latch 60 results in the engagement of the bent portion 64 with the curved portion 46 of the movable anchor 40 which has undergone downward movement or the contact of the bent portion 64 with a side wall of the curved portion 46 of the movable anchor 40 which has undergone downward movement (Note: The positional relationship among these portions are set in such a way that the bent portion 64 is not brought into contact with the lower surface of the curved portion 46.).

When the bent portion 64 of the latch 60 has been brought into contact with the side wall of the curved portion 46 of the movable anchor 40, the latch 60 is no longer turnable counterclockwise and the slider 70 is only moved downward by the latch actuator 56, and at the same time, the movable anchor 40 is moved downward by the movable anchor guide 52. When the curved portion 46 of the movable anchor 40 has been moved downwardly beyond the bent portion 64 of the latch 60, the latch 60 is turned counterclockwise owing to the action of the spring 90 and its bent portion 64 engages the curved portion 46. After the bent portion 64 of the latch 60 has engaged the curved portion 46 of the movable anchor 40, the latch 60 is allowed to turn counterclockwise until its second arm 68 contacts the stopper 92 of the anchor latch cover 58. Here, the second arm 68 depresses the actuating lever 19 of the rear end switch 18, the operation of the motor 24, namely, the movement of the movable member 28 is stopped, and the movable anchor 40 is thus stopped to assume the state depicted in FIG. 2. At this stage, the engagement notch 44 of the movable anchor 40 is kept in engagement with the anchor pin 50. In this state, the movable anchor 40 is in its occupant-restraining position. Forces, which are exerted in the lower right direction to the movable anchor as viewed in FIG. 2, are borne by the anchor pin 50, while those applied upwardly to the movable anchor 40 are received by the latch 60.

Figure 2:
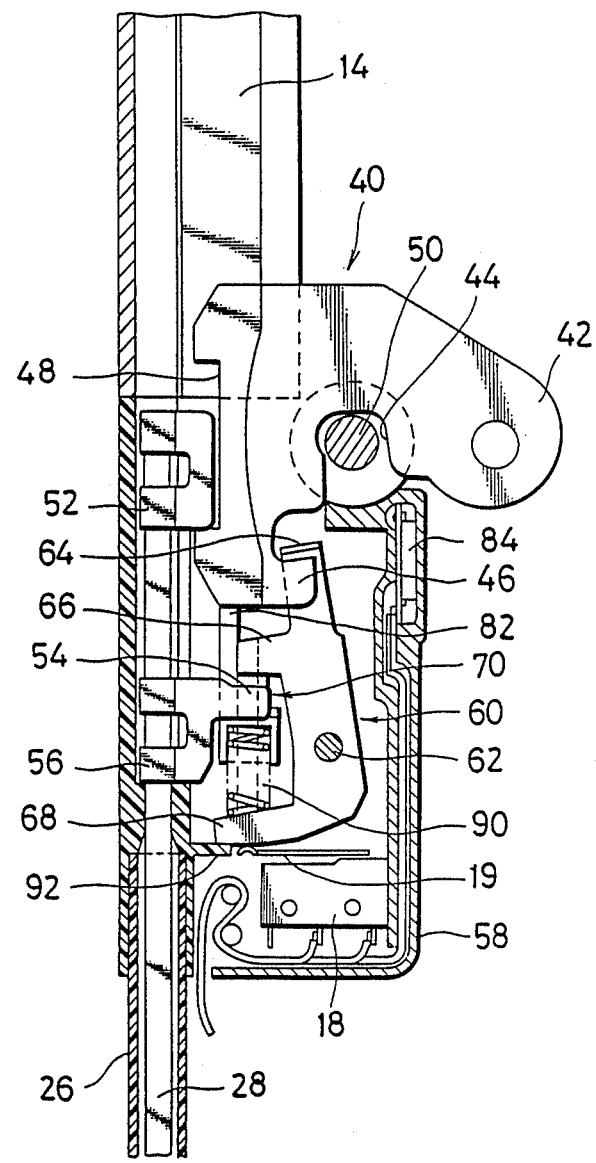
FIG. 2 is a cross-sectional view illustrating a latch device according to the first embodiment of this invention.
Figure 3:
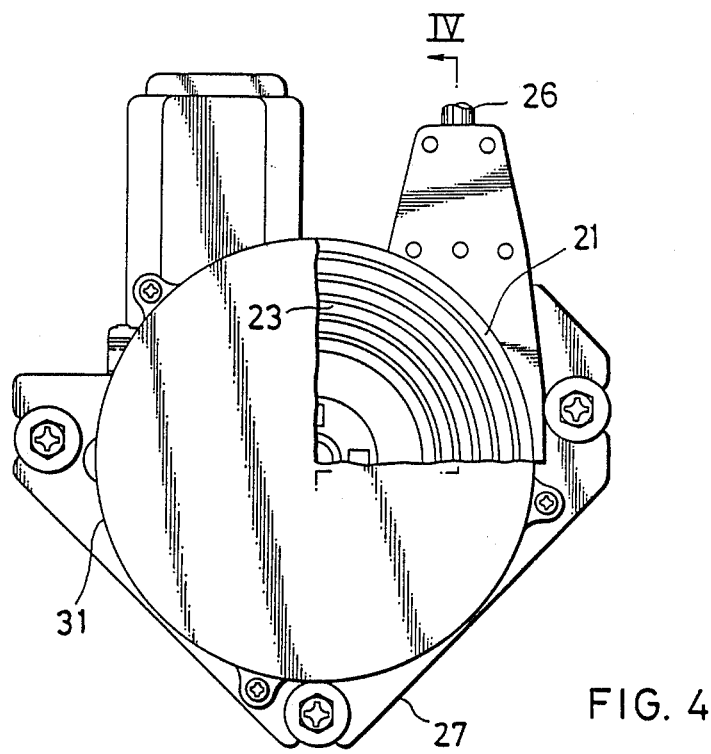
FIG. 3 is a partially cut-away front view of a retractor for a moving member.
Figure 4:
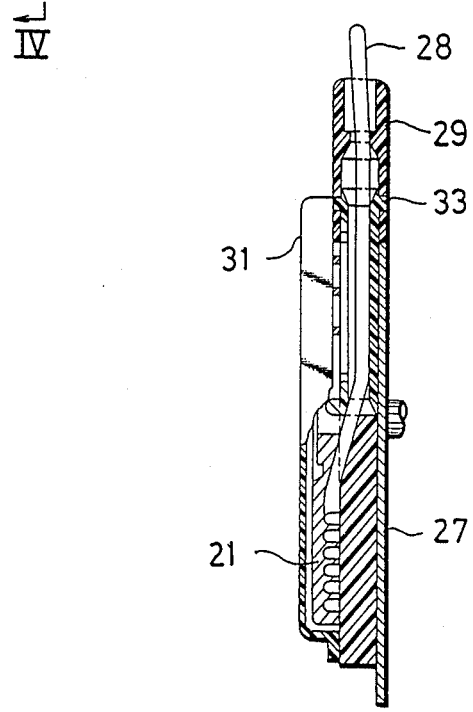
FIG. 4 is a cross-sectional view taken along line. IV—IV in FIG. 3.

In the state shown in FIG. 2 in which the movable anchor 40 is locked by the latch 60, the lug 82 of the slider 70 which is biased upwardly by the spring 90 is kept in contact with the lower surface of the curved portion of the curved portion 46 of the movable anchor 40. Thus, the movable anchor 40 is urged upwardly by the action of the spring 90 by way of the slider 70, while the latch 60 is urged counterclockwise owing to the action of the spring 90. As a result, the curved portion 46 of the movable anchor 40 are kept in positive contact and engagement with the bent portion 64 of the latch 60. Therefore, these portions do not produce noise or are not disengaged even when the vehicle is bounced.

When the door has been opened before the occupant gets off the vehicle, the motor 24 is actuated so as to drive the drive member 28 upwardly as viewed in FIG. 2. Thus, the latch actuator 56 is moved upwardly so that the head 54 of the latch actuator 56 is rendered out of contact with the bottom wall of the socket 76 of the slider 70. This causes the slider 70 to rise owing to the action of the spring 90. When the the abutment surface 78 of the slider 70 has been brought into contact with the lower surface of the first arm 66 of the latch 60, the upward movement of the slider 70 is inhibited. Thereafter, the latch actuator 56 is solely caused to rise.

A further upward movement of the latch actuator 56 result in the contact between its head 54 and the first arm 66 of the latch 60. Thereafter, the latch 60 is turned clockwise against the action of the spring 90 by the head 54 of the latch actuator 56. Accompanied with this clockwise turn of the latch 60, the slider 70 is caused to move upwardly. When the latch 60 has turned clockwise over a certain angle, the abutment surface 80 of the slider 70 enters beside the first arm 66 of the latch 60 and the slider is allowed to move to its uppermost position determined by the slot formed through the anchor latch cover 58 and is stopped at the uppermost position. In order to ensure the above-mentioned entry of the abutment surface 80, the length of the head 54 of the latch actuator 56 is designed somewhat longer than the distance from the latch actuator 56 to the abutment surface 80 of the slider 70 so that the latch 60 is allowed to turn clockwise significantly.

When the latch 60 has been turned clockwise by the latch actuator 56, its bent portion 64 is released from the engagement with the curved portion 46 of the movable anchor 40. After the disengagement between the bent portion 64 and the curved portion 46, the movable anchor 40 is pushed by the movable anchor guide 52 and begins its upward movement together with the ERB 22. Since the latch 60 has already been turned clockwise to a sufficient extent, there is no danger that the bent portion 64 would interfere the curved portion 46 of the movable anchor 40 and vice versa.

When the latch actuator 56 has moved further upwardly and its head 54 is separated from the first arm 66 of the latch 60, the latch 60 begins to turn counterclockwise under the action of the spring 90. The latch 60 is however prevented from turning counterclockwise and is thus maintained in this state, since the abutment surface 80 of the slider 70 has already been positioned over the side wall of the first arm 66 of the latch 60. The movable anchor 40 and ERB 22 are driven along the guide rail 14 to their front end positions to assume their state mentioned above.

The latch device of the first embodiment has inter alia the following features. First of all, the spring 90 serves as a spring for holding the movable anchor 40 and latch 60 always in contact at the lowermost position of the movable anchor 40 (namely, serving as a damper), as a spring for biasing the latch 60 in the latching direction (i.e., in the counterclockwise direction), and as a spring for holding via the slider 70 the latch 60 either at the engagement position where the latch 60 engages the movable anchor 40 or at the non-engagement position where the latch 60 is kept out of engagement with the movable anchor 40. Secondly, the rear end switch 18 also serves as a switch for confirming the actuation of the latch. Namely, the switch 18 is caused to actuate only when the latch 60 has turned counterclockwise and has engaged the movable anchor 40. As a third future, the latch 60 does not interfere the drive member 28 and latch actuator 56 and does not give any influence to them while it does not engage the movable anchor 40 (i.e., it does not take the stage illustrated in FIG. 8).

Figure 10:
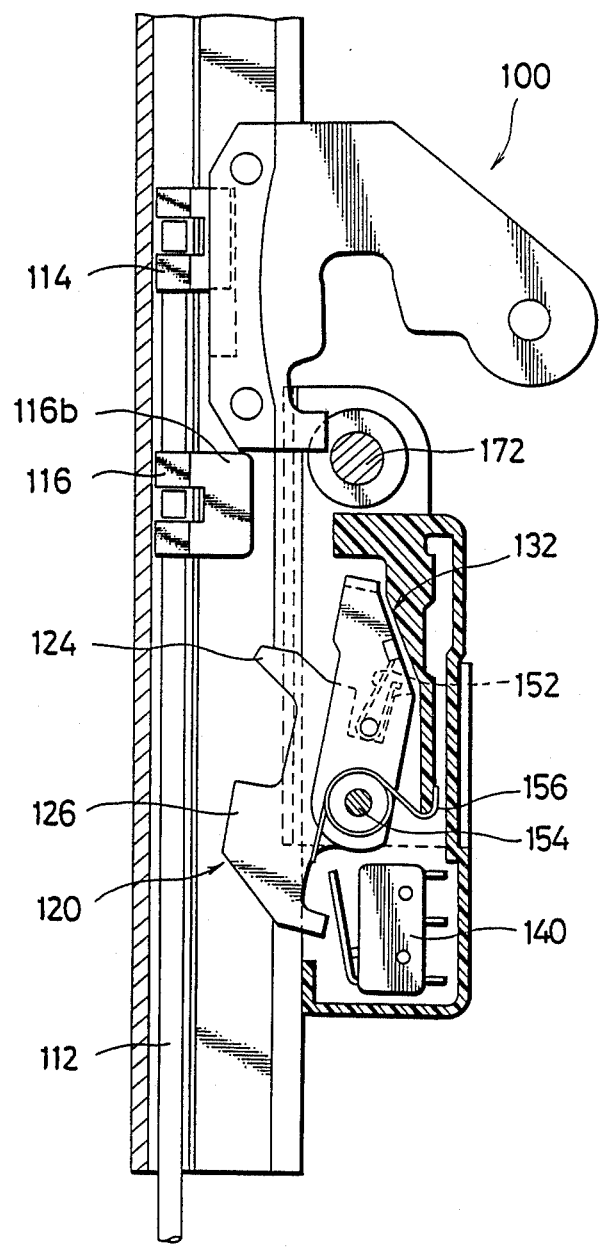
FIGS. 10 and 11 are cross-sectional views depicting the operation of the latch device of the second embodiment.
Figure 11:
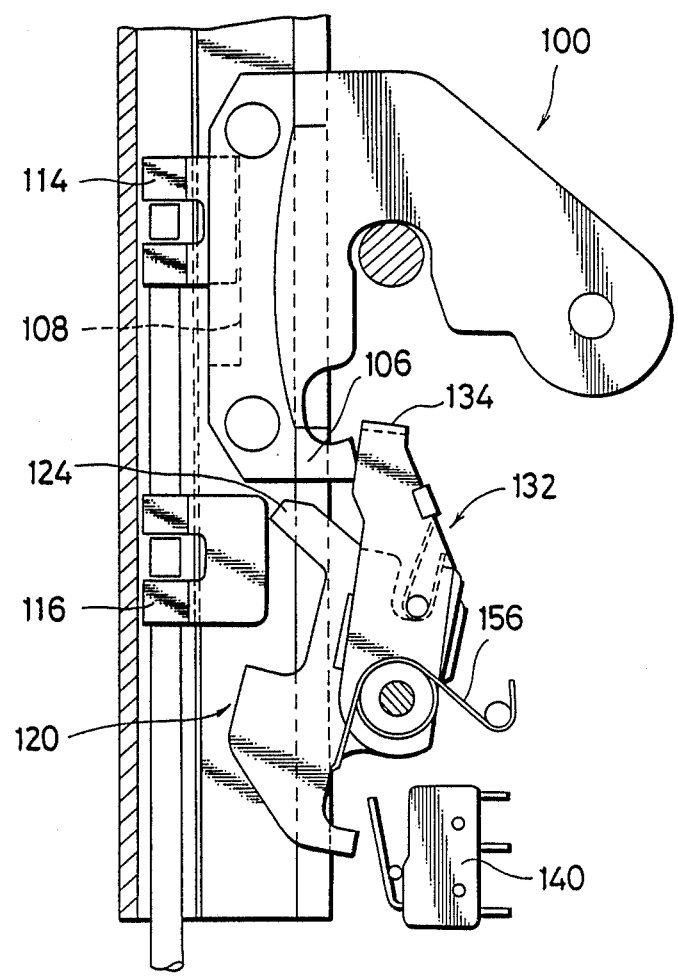

The latch device according to the second embodiment of this invention will next be described with reference to FIGS. 9 through 11. Since the overall structure of the passive seat belt system incorporating the latch device of the second embodiment is similar to that depicted in FIG. 1, its drawing and description are omitted.

Figure 9:
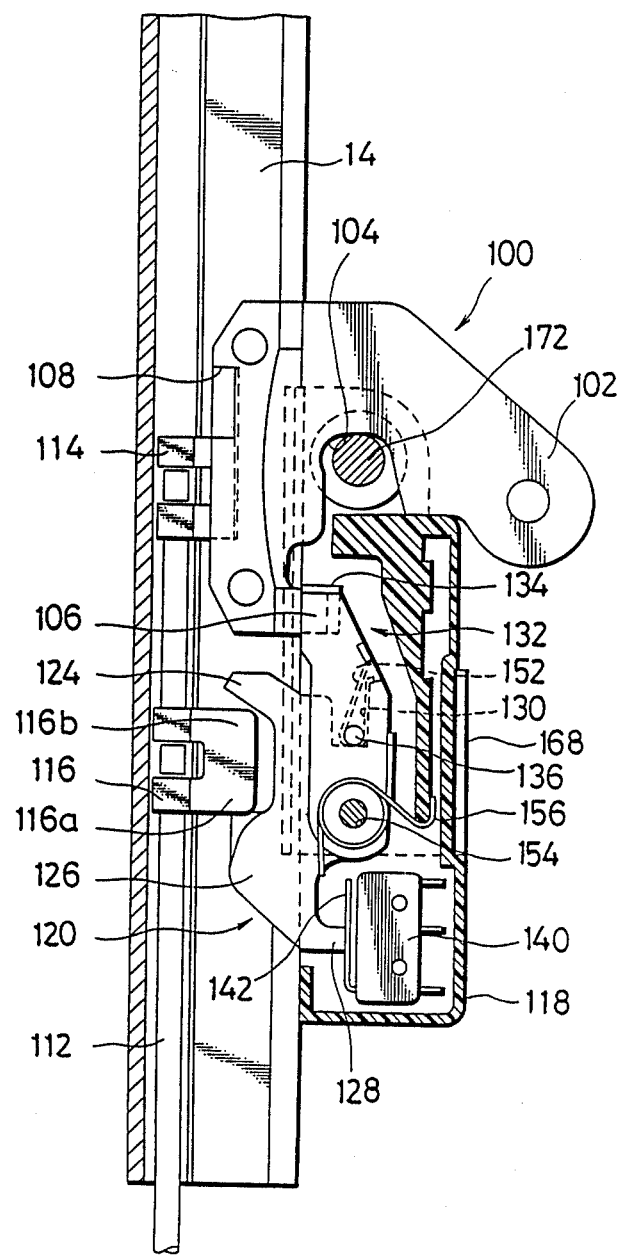
FIG. 9 is a cross-sectional view illustrating a latch device according to the second embodiment of this invention.

In FIG. 9, a movable anchor 100 attached movably to the guide rail 14 includes, similar to the above-described first embodiment, an interlocking tab 102 engageable with the ERB 22 (see, FIG. 1), an engagement notch 104 permitting the fitting-in and engagement of an anchor pin 172, a curved portion 106 engageable with a latch 132, and a recess 108 in which a movable anchor guide 114 is engagedly fit. At a leading end portion of a wire 112 which serves as a drive member, the movable anchor guide 114 is attached. At a portion of the wire 112 which portion is somewhat apart rearwardly from the leading end thereof, there is attached a latch actuator 116.

Within a latch case 118 provided as a unitary member with an anchor base 168 which will be described later, a latch 132 and latch-releasing member 120 are provided turnably about a pivot 154. The latch-releasing member 120 includes a first leg 124 and bulge 126 which are brought into contact with the latch actuator 116, a second leg 128 which is brought into contact with an actuating lever 142 of a rear end switch 140, and a notch 130. On the other hand, the latch 132 includes a bent portion 134, which serves as a second interlocking portion and is engageable with the curved portion of the movable anchor 100, and a pin 136 provided perpendicularly to the latch 132 so that the pin 136 is positioned within the notch 130 of the latch-releasing member 120. A spring 152 is provided around the pin 136. One of the legs of the spring 152 is kept in contact with a side edge of the notch 130 of the latch-releasing member 120, whereas the other leg is hooked on the latch 132. Furthermore, a torsion spring 156 is provided around the pivot 154. One of the legs of the torsion spring 156 is hooked on a part of the latch cover 118, while the other leg is hooked on the latch-releasing member 120. Accordingly, under the action of the spring 152, the latch 132 and the latch-releasing member 120 are biased respectively counterclockwise and clockwise, whereas the latch-releasing member 120 is biased clockwise under the action of the spring 156. The anchor base 168 is mounted directly on the vehicle body by bolts (not shown) in such a way that the position of the anchor base 168 is adjustable relative to the vehicle body. The anchor base 168 is movable for its positional adjustment along the length of the guide rail 14 (i.e., in the vertical direction as viewed in FIG. 9) while being guided by guide grooves of the guide rail 14. In this manner, the latch device can be mounted on the vehicle body without difficulties by adjusting its position even if the anchor bolts of the vehicle body and the mounting position of the guide rail 14 are offset relative to each other.

The operation of the latch device according to the second embodiment will next be described.

When the occupant has closed the door subsequent to his entry into the vehicle, the motor 24 is driven and the wire 112 is taken up. Thus, the movable anchor 100 is caused to move rearwardly on the guide rail 14 by way of the movable anchor guide 114. Since the latch 132 is at this stage in a state turned clockwise under the action of the spring 156, this is no danger that its bent portion 134 interferes the curved portion 106 of the movable anchor 100 and vice versa.

When the movable anchor 100 has approached the latch 132, a lower shoulder 116a of the latch actuator 116 is brought into contact with the bulge 126 of the latch-releasing member 120, whereby causing the latch 132 to turn counterclockwise against the action of the spring 156 by way of the latch-releasing member 120 and pin 136. When the latch 132 turns counterclockwise, its bent portion 134 is brought into engagement with the curved portion 106 of the movable anchor 100 or into contact with a side wall of the curved portion 106. When the bent portion 134 of the latch 132 has been brought into contact with the side wall of the curved portion 106 of the movable anchor 100, the bent portion 134 is prohibited from any further counterclockwise turn but the latch-releasing member 120 is allowed to continue its counterclockwise turn because the spring 152 is deformed. When the movable anchor 100 has moved downwardly to a predetermined position, the latch 132 is turned counterclockwise under the action of the spring 156 and the bent portion 134 is brought into engagement with the curved portion 106. This is the state which is depicted in FIG. 9. Even if the latch-releasing member 120 becomes rickety, there is no danger owing to the action of the spring 152 provided on the latch 132 that the latch 132 would be turned counterclockwise and would thus be disengaged. In addition, the anchor pin 172 is received in and is kept in contact with the engagement notch 104. Accordingly, lateral loads which are exerted from the webbing 34 (see, FIG. 1) to the movable anchor 100 are borne by the anchor pin 172.

When the occupant has opened the door in order to get off the vehicle, the motor 24 (see, FIG. 1) is driven to release the wire 112. Therefore, the latch actuator 116 and movable anchor guide 114 are both caused to move upwardly as viewed in FIG. 9. When the latch actuator 116 moves upward, its upper shoulder 116b is brought into contact with the first leg 124 and the latch-releasing member 120 is thus turned clockwise. Since the latch 132 has already been turned counterclockwise by the spring 152 at this stage, the latch 132 is turned clockwise by way of the pin 136 when the latch-releasing member 120, which has been kept in engagement with the movable anchor 100, has been turned clockwise and the notch 130 has been brought into contact with the pin 136 of the latch 132. As a result, the bent portion 134 of the latch 132 is released from its engagement with the curved portion 106 of the movable anchor 100 (see, FIG. 11). When the wire 112 is paid out further, the movable anchor guide 114 is brought into contact with the upper end edge of the recess 108 as depicted in FIG. 11, and the movable anchor 100 is thereafter caused to move along the guide rail 14.

Since the latch-releasing member 120 is in a state turned clockwise under the action of the spring 156, the second leg 129 of the latch-releasing member 120 does not actuate the actuating lever 142 of the rear end switch 140.

Referring now to the behavior of the spring 152, when the movable anchor 100 is raised upward while the wire 112 is held standstill, the wire 112 is caused to move a little upwardly at the same time. Thus, the lower shoulder 116a of the latch actuator 116 is rendered out of contact with the bulge 126 of the latch-releasing member 120. As a result, the latch-releasing member 120 is turned clockwise under the action of the spring 156 but this turning motion is absorbed by the spring 152. The turning motion of the latch releasing member 120 is thus not transmitted to the latch 132 (Note: The latch 132 has been urged counterclockwise by the spring 152.), thereby permitting the engagement of the latch 132 with the movable anchor 100.

The latch device of the second embodiment has inter alia the following features. When the movable anchor 100 is at its front end position on the guide rail 14 (i.e., when the webbing 34 is in its occupant-releasing position), the latch 132 is urged clockwise by the spring 156 and holds the rear end switch in its open state. Thus, the rear end switch 140 serves as a stopper switch for the movable anchor 100 and at the same time, as a latch-confirming switch. Thus, only one switch is required for the above-mentioned both purposes. This is meritorious as one switch can be saved and the space and wiring for the second switch can also be rendered unnecessary. Another significant merit has also been brought about owing to the provision of the spring 152. This merit has already been described with respect to the latch device of the first embodiment. Its description is thus omitted here.

A modification of the mechanism for the adjustment of the position of the latch device for the movable anchor will next be described with reference to FIGS. 12 through 15.

Figure 12:
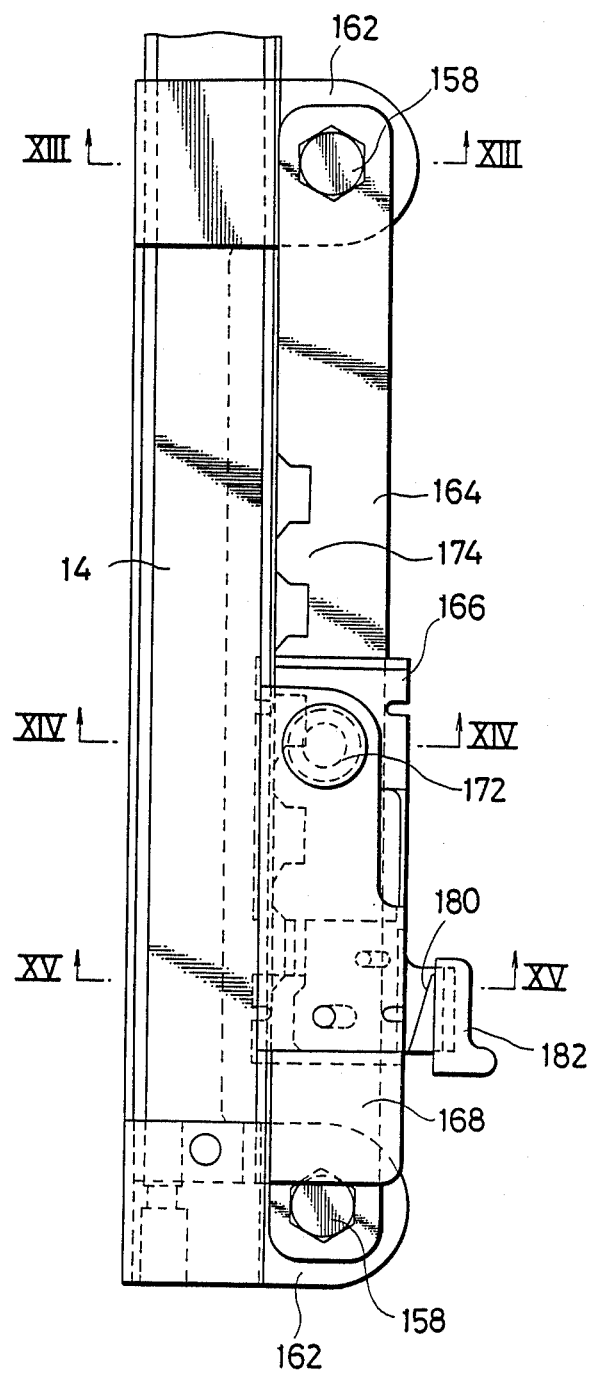
FIG. 12 is a front view showing a modification of an adjustable mounting mechanism.
Figure 13:
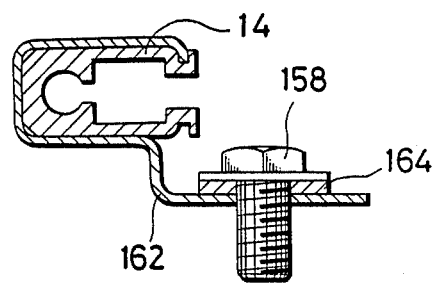
FIGS. 13 through 15 are cross-sectional views taken respectively along lines VIII—VIII, XIV—XIV and XV—XV.
Figure 14:
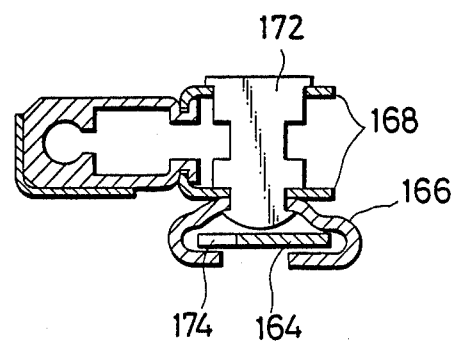
Figure 15:
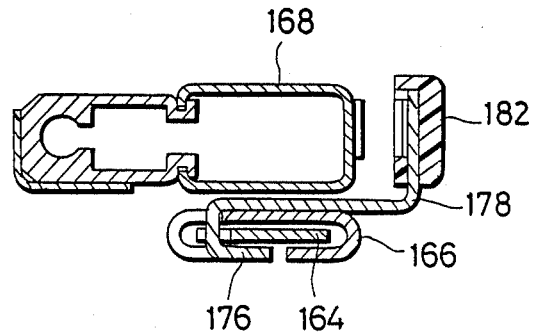

As shown in FIGS. 12 and 13, the guide rail 14 is held in place by a bracket 162 secured fixedly on the vehicle body by a pair of mounting bolts 158. A base 164 extends between both mounting holes of the bracket 162. An adjustable anchor 166 is attached to the base 164 movably along the length of the base 164. An anchor base 168 which has a turned square U-shaped transverse cross-section is held as a unitary member with the adjustable anchor 166 by means of an anchor pin 172. Both free edges of the anchor base 168 are respectively fit in the guide grooves of the guide rail 14(see, FIG. 15). Accordingly, the anchor base 168 and adjustable anchor 166 are displaceable relative to the guide rail 14 and base 164. Teeth 174 are spacedly formed in one longitudinal edge of the base 164. A bent portion 176 of a latch 178, which is attached on the adjustable anchor 166 displaceably in the lateral direction as seen in FIG. 12, is engageable with these teeth 174. The latch 178 is biased rightward (as viewed in FIG. 12) by a spring 180.

The position of the latch may be adjusted in the following manner. When a button 182 of the latch 178 is pressed leftward as viewed in FIG. 12, its bent portion 176 is disengaged from the teeth 174 of the base 164, thereby making the latch casing 118, adjustable anchor 166 and anchor base 168 displaceable relative to the guide rail 14 and base 164 in the vertical direction as viewed in FIG. 12. As a result, the positions of the anchor pin 172, latch 132, latch-releasing member and the like have been changed vertically and the lock position of the movable anchor 100 has thus been changed.

Since the positional relation between the guide rail 14 and base 164 is kept constant by the bracket 162 in this modification, the relative positions of the base and guide rail can be adjusted correctly. This feature assures smooth movements for the adjustable anchor and also permits fail-free latching. As other features, may also be mentioned that such members have been assembled into a compact unit, the number of parts has been reduced owing to the arrangement of the latch 178 between the anchor base 168 and adjustable anchor 166, and the mounting of the anchor base 168 to the vehicle body has been facilitated as the anchor base 168 is displaceable relative to the guide rail 14.

In the present invention, the position of the latch is directly related to whether the movable anchor has been locked by the latch or not as has been described above. Accordingly, improved reliability has been materialized as to the switch means for stopping the motor or the like and the switch means for the warning device which serves to confirm the latched state, and it is necessary to provide only one switch means for both of the above-mentioned purposes. Exclusion of the second switch means has brought about such advantageous effects that the latch device has been rendered compact in its entirety and economical.

Having now fully described the invention, it will be apparent to one of ordinary skill in the art that many changes and modifications can be made thereto without departing from the spirit or scope of the invention as set forth herein.

What is claimed is:

1. A latch device for a movable anchor, the position of said latch device being adjustable, comprising:
   a guide rail defining a groove along the length thereof;
   a movable anchor disposed movably along the guide rail and connected to a webbing, said movable anchor being displaceable between an occupant-restraining psoition, wherein the webbing restrains the occupant, and an occupant-releasing position where the webbing releases the occupant;
   a planar base provided in parallel with and in the proximity of the guide rail and defining a plurality of interlocking portions;
   a bracket receiving in the groove formed in the guide rail and connecting the guide rail to the base, with the base supported on the bracket;
   an adjustable anchor provided movably along the base;
   a latch mounted movably on the adjustable anchor, said latch being displaceable between an engagement position where the latch engages with any one of the interlocking portions of the base and a non-engagement position where the latch is maintained out of engagement with any one of the interlocking portions of the base; and
   anchor means mounted on the adjustable anchor and adapted to bear loads applied to the movable anchor while the movable anchor assumes the occupant-restraining position.

2. The latch device as claimed in claim 1, wherein the anchor means is an anchor pin mounted on the adjustable anchor.

3. The latch device as claimed in claim 1, additionally comprising latch means provided on the adjustable anchor in order to prevent the movable anchor from moving toward the occupant-releasing position.

4. The latch device as claimed in claim 1, wherein the latch is movable in a direction transverse to the base.

5. A latch device for a movable anchor in a passive seat belt system, the position of said latch device being adjustable, comprising:
   a guide rail;
   a movable anchor disposed movably along the guide rail and connected to a webbing;
   drive means for causing the movable anchor to move along the guide rail between an occupant-restraining position, where the webbing restrains the occupant, and an occupant-releasing position where the webbing releases the occupant;
   means for bearing loads applied to the moveable anchor while the movable anchor assumes the occupant-restraining position; and
   a bracket connecting the guide rail to the load-bearing means;
   wherein said load-bearing means comprises:
   a base supported on the bracket;
   an adjustable anchor provided movably along the base;
   means for supporting the adjustable anchor at a predetermined position relative to the base; and
   means provided on the adjustable anchor for engaging the movable anchor when the movable anchor assumes the occupant-restraining position.

6. The latch device as claimed in claim 5, wherein the base is mounted on the body of a vehicle.

7. The latch device as claimed in claim 5, wherein the adjustable anchor supporting means comprise a plurality of interlocking portions formed in the base and a latch supported on the adjustable anchor and displaceable between an engagement position where the latch engages with any one of the interlocking portions and a non-engagement position where the latch is maintained out of engagement with any one of the interlocking portions.

8. The latch device as claimed in claim 5, wherein the guide rail defines a slit formed along the length of the guide rail so as to allow the movable anchor to move along the length of the guide rail with a part of the movable anchor extending out from the guide rail, and the base is positioned on the side of the slit relative to the guide rail.

9. The latch device as claimed in claim 5 wherein the load bearing means engages at a part thereof with the guide rail, whereby the load bearing means is guided by the guide rail.

10. A latch device for a movable anchor in a passive seat belt system, the position of said latch device being adjustable, comprising:
 a guide rail defining a groove along the length thereof;
 a movable anchor disposed movably along the guide rail and connected to a webbing;
 drive means for causing the movable anchor to move along the guide rail between the occupant-restraining position, where the webbing restrains the occupant, and an occupant-releasing position where the webbing releases the occupant;
 means for bearing loads applied to the movable anchor while the movable anchor assumes the occupant-restraining position; and
 a bracket connecting the guide rail to the load-bearing means;
 wherein the bracket has upper and lower end portions fit at free ends thereof in the groove, both of said upper and lower end portions extending from the respective free ends thereof and surrounding the outer wall of the guide rail, and extending further in a direction transverse to the guide rail, and an intermediate portion extending along the guide rail and connecting the upper and lower end portions to each other, and wherein the base extends between the upper and lower end portions.

11. A latch device for a movable anchor in a passive seat belt system, comprising:
 a guide rail defining a slit along the length thereof;
 a movable anchor disposed movably along the guide rail while being guided by the slit and connected to a webbing;
 drive means for causing the movable anchor to move along the guide rail between an occupant-restraining position, where the webbing restrains the occupant, and an occupant-releasing position where the webbing releases the occupant;
 an anchor pin provided in the proximity of the guide rail on the side of the slit and adapted for engagement with the movable anchor when the movable anchor assumes the occupant-restraining position;
 an anchor base supporting both ends of the anchor pin and connected to the guide rail; and
 means for holding the anchor base on the guide rail movably along the length of the guide rail.

12. The latch device as claimed in claim 11, wherein the holding means comprises a guide groove formed in the guide rail along the length of the guide rail, and a bent edge portion formed in the anchor base and fit in the guide groove.

* * * * *